United States Patent
Zeiynali Farid et al.

(10) Patent No.: US 12,511,993 B2
(45) Date of Patent: Dec. 30, 2025

(54) SYSTEMS AND METHODS FOR CONFIGURING A HIERARCHICAL TRAFFIC MANAGEMENT SYSTEM

(71) Applicant: Toyota Motor Engineering & Manufacturing North America, Inc., Plano, TX (US)

(72) Inventors: Yashar Zeiynali Farid, Berkeley, CA (US); Emrah A. Sisbot, Menlo Park, CA (US); Xiaofei Cao, Mountain View, CA (US); Haritha Muralidharan, Santa Clara, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 288 days.

(21) Appl. No.: 18/104,863

(22) Filed: Feb. 2, 2023

(65) Prior Publication Data
US 2024/0265802 A1    Aug. 8, 2024

(51) Int. Cl.
G08G 1/01      (2006.01)
G08G 1/017     (2006.01)

(52) U.S. Cl.
CPC ......... *G08G 1/0145* (2013.01); *G08G 1/0116* (2013.01); *G08G 1/0125* (2013.01); *G08G 1/017* (2013.01)

(58) Field of Classification Search
CPC .. G08G 1/0145; G08G 1/0116; G08G 1/0125; G08G 1/017; G08G 1/0104; G08G 1/00; G08G 1/065
See application file for complete search history.

(56) References Cited

U.S. PATENT DOCUMENTS 9,603,158 B1 *  3/2017  Ross ...................... H04L 67/04
10,380,886 B2   8/2019  Ran et al.
(Continued)

OTHER PUBLICATIONS

Baskar et al, Hierarchical Traffic Control and Management with Intelligent Vehicles, Jun. 13, 2007, IEEE, All pages (Year: 2007).*

(Continued)

*Primary Examiner* — Wilson W Tsui
(74) *Attorney, Agent, or Firm* — Christopher G. Darrow; Darrow Mustafa PC

(57) ABSTRACT

Systems and methods described herein relate to configuring a hierarchical traffic management system. One embodiment receives, at a cloud server, a request from an application, the request including requirements and implicating configuration of a hierarchical traffic management system; determines, based on information received from one or more connected vehicles in an area of interest pertaining to the request, a minimum density of connected vehicles in the area of interest to meet the requirements; calculates an optimum number of connected vehicles to assign to a section manager in the hierarchical traffic management system; calculates the size of a section of the roadway to be managed by the section manager in the area of interest based, at least in part, on the minimum density of connected vehicles and the optimum number of connected vehicles; and activates the hierarchical traffic management system in accordance with the calculated size of the section.

20 Claims, 6 Drawing Sheets

(56) References Cited

U.S. PATENT DOCUMENTS

| | | | |
|---|---|---|---|
| 2003/0060965 A1* | 3/2003 | MacPhail | G08G 1/0104 340/907 |
| 2007/0271029 A1* | 11/2007 | Tzamaloukas | G01C 21/28 701/532 |
| 2013/0304863 A1* | 11/2013 | Reber | H04L 67/10 709/218 |
| 2016/0379486 A1* | 12/2016 | Taylor | G08G 1/08 340/905 |
| 2018/0270165 A1* | 9/2018 | Chen | G06F 9/4881 |
| 2018/0336780 A1* | 11/2018 | Ran | G08G 1/0129 |
| 2019/0045378 A1* | 2/2019 | Rosales | H04L 67/34 |
| 2019/0327619 A1* | 10/2019 | Altintas | H04W 48/18 |
| 2020/0312129 A1* | 10/2020 | Oyama | G08G 1/096725 |
| 2021/0110708 A1 | 4/2021 | Yang et al. | |
| 2022/0198839 A1* | 6/2022 | Santamala | B60W 60/001 |

OTHER PUBLICATIONS

Kamal et al, A Survey and Taxonomy of Urban Traffic Management, Sep. 15, 2014, All pages (Year: 2014).*

M. Mujahid et al., "Cluster-Based Location Service Schemes in VANETs: Current State, Challenges and Future Directions," Telecommunications Systems, Springer, 2020.

X. Liu et al., "Securing Connected Vehicle Applications with an Efficient Dual Cyber-Physical Blockchain Framework," arXiv:2102.07690v1 [cs.CR], Feb. 15, 2021.

*BASCOM Global Internet v. AT&T Mobility LLC,* 119 USPQ2d 1236 (Fed. Cir. 2016) Available at: https://acrobat.adobe.com/id/urn:aaid:sc:VA6C2:a4e17a63-bdc7-41a1-9363-b6ddf9bd28ec.

*Uniloc USA, Inc. v. LG Elecs. USA, Inc.,* No. 19-1835 (Fed. Cir. Apr. 30, 2020) Available at: https://acrobat.adobe.com/id/urn:aaid:sc:VA6C2:f1e2e2b0-6528-4081-b6fc-38b8dcf2d301.

* cited by examiner

SYSTEMS AND METHODS FOR CONFIGURING A HIERARCHICAL TRAFFIC MANAGEMENT SYSTEM

TECHNICAL FIELD

The subject matter described herein relates in general to vehicle traffic flow regulation systems and, more specifically, to systems and methods for configuring a hierarchical traffic management system.

BACKGROUND

In a hierarchical traffic management system, a high-level node (e.g., a locality manager implemented in a cloud server) communicates with one or more low-level section managers. The section managers communicate with connected vehicles in their respective sections to transmit information or instructions and to obtain information. The size of the section assigned to a given section manager plays a crucial role in the efficiency of the system. If the section is too small, the system has an excessive number of section managers, which increases the cost, latency, and complexity of the system. If the section is too large, the capacity of the section manager might be insufficient. Moreover, the computational complexity of the operations performed by the section manager can become intractable, and the energy consumption can increase exponentially.

SUMMARY

Embodiments of a system for configuring a hierarchical traffic management system are presented herein. In one embodiment, the system comprises a processor and a memory storing machine-readable instructions that, when executed by the processor, cause the processor to receive, at a cloud server, a request from an application, wherein the request includes requirements and implicates configuration of the hierarchical traffic management system. The memory also stores machine-readable instructions that, when executed by the processor, cause the processor to determine, based on information received from one or more connected vehicles in an area of interest pertaining to the request, a minimum density of connected vehicles per lane of a roadway in the area of interest to meet the requirements. The memory also stores machine-readable instructions that, when executed by the processor, cause the processor to calculate an optimum number of connected vehicles to assign to a section manager in the hierarchical traffic management system. The memory also stores machine-readable instructions that, when executed by the processor, cause the processor to calculate a size of a section of the roadway to be managed by the section manager in the area of interest based, at least in part, on the minimum density of connected vehicles and the optimum number of connected vehicles. The memory also stores machine-readable instructions that, when executed by the processor, cause the processor to activate the hierarchical traffic management system in accordance with the calculated size of the section of the roadway.

Another embodiment is a non-transitory computer-readable medium for configuring a hierarchical traffic management system and storing instructions that, when executed by a processor, cause the processor to receive, at a cloud server, a request from an application, wherein the request includes requirements and implicates configuration of the hierarchical traffic management system. The instructions also cause the processor to determine, based on information received from one or more connected vehicles in an area of interest pertaining to the request, a minimum density of connected vehicles per lane of a roadway in the area of interest to meet the requirements. The instructions also cause the processor to calculate an optimum number of connected vehicles to assign to a section manager in the hierarchical traffic management system. The instructions also cause the processor to calculate a size of a section of the roadway to be managed by the section manager in the area of interest based, at least in part, on the minimum density of connected vehicles and the optimum number of connected vehicles. The instructions also cause the processor to activate the hierarchical traffic management system in accordance with the calculated size of the section of the roadway.

Another embodiment is a method of configuring a hierarchical traffic management system, the method comprising receiving, at a cloud server, a request from an application, wherein the request includes requirements and implicates configuration of a hierarchical traffic management system. The method also includes determining, based on information received from one or more connected vehicles in an area of interest pertaining to the request, a minimum density of connected vehicles per lane of a roadway in the area of interest to meet the requirements. The method also includes calculating an optimum number of connected vehicles to assign to a section manager in the hierarchical traffic management system. The method also includes calculating a size of a section of the roadway to be managed by the section manager in the area of interest based, at least in part, on the minimum density of connected vehicles and the optimum number of connected vehicles. The method also includes activating the hierarchical traffic management system in accordance with the calculated size of the section of the roadway.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments of systems and methods for configuring a hierarchical traffic management system described herein include techniques to determine the proper size of a section managed by a section manager in the hierarchical traffic management system as the system is activated/instantiated. In one embodiment, a cloud server receives a traffic-management-related request from an application. For example, the application could be, without limitation, an incident management system responding to an incident (e.g., an accident, a slow-moving vehicle, etc.) on a roadway, a lane-level vehicle navigation system, a traffic congestion mitigation system, or a driver anomalous behavior management system (e.g., a system that detects and mitigates vehicles driven by substance-impaired drivers). The request from the application includes various requirements and implicates the configuration of a hierarchical traffic management system. For example, in some situations, responding to the application request (gathering information from and transmitting information/instructions to connected vehicles) necessitates the configuration and activation, at least temporarily, of a hierarchical traffic management system. The architecture of such a system is explained in greater detail below in connection with FIG. 2.

In the embodiment just mentioned, the cloud server determines, based on information received from connected vehicles in an area of interest specified in the request, the minimum density of connected vehicles per lane of the roadway in the area of interest so that the requirements of the request can be met. The cloud server also calculates the optimum number of connected vehicles to assign to a given section manager in the hierarchical traffic management system. The cloud server also calculates the size of the section of roadway to be managed by the section manager in the area of interest based, at least in part, on the calculated minimum density of connected vehicles and the calculated optimum number of connected vehicles. In some embodiments, the size of the section is expressed as a length, the cloud server taking into account that the section of roadway in question might include multiple lanes. In another embodiment, the section includes at least a portion of an intersection, and the size is expressed as an arca.

Once the size of a given section has been calculated, the cloud server activates the hierarchical traffic management system in accordance with the calculated size of the section. Other aspects of various embodiments of systems and methods for configuring a hierarchical traffic management system are discussed below.

Figure 1:
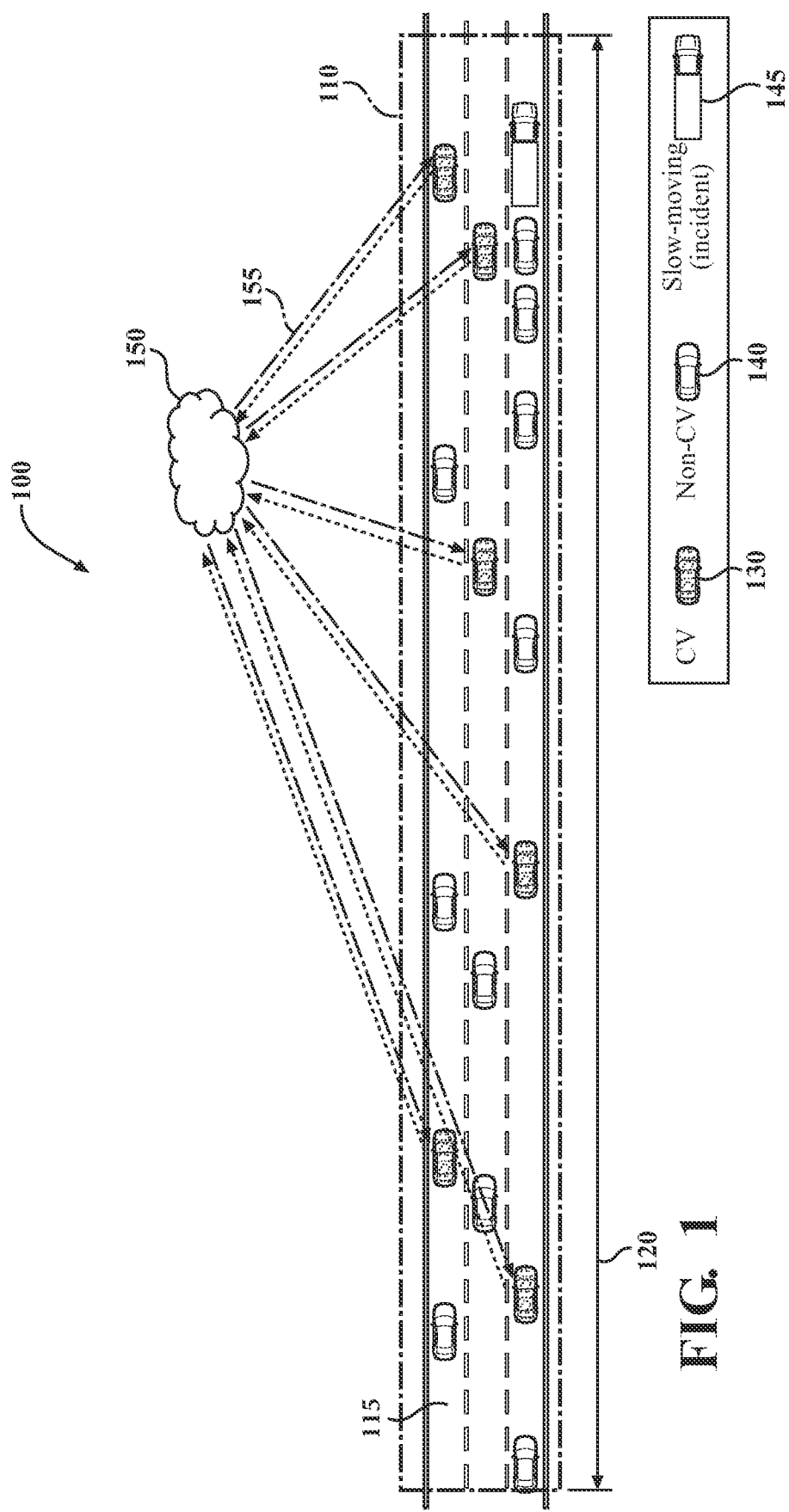
FIG. 1 is a diagram of an environment in which various embodiments of a system for configuring a hierarchical traffic management system can be deployed.

FIG. 1 is a diagram of an environment 100 in which various embodiments of a system for configuring a hierarchical traffic management system can be deployed. FIG. 1 depicts an area of interest 110 pertaining to a request from an application. In this embodiment, the area of interest 110 encompasses a segment of a three-lane roadway 115. In a different embodiment, area of interest 110 encompasses at least a portion of a roadway intersection. Also, in other embodiments the number of lanes can vary (i.e., there can be fewer or more than the three lanes depicted in FIG. 1). In one example scenario that will be elaborated upon below in connection with FIG. 3, the area of interest 110 has a length 120 of 4 km, but this is merely one illustrative example. As shown in FIG. 1, roadway 115, within the area of interest 110, is traveled by connected vehicles (CVs) 130 and non-connected vehicles (non-CVs) 140. Herein, a "connected vehicle" 130 is a vehicle equipped to communicate with other nodes (servers, other vehicles, etc.) via a network. In some embodiments, the connected vehicles 130 employ technologies such as cellular data (LTE, 5G, 6G, etc.), Dedicated Short-Range Communications (DSRC), Bluetooth® Low Energy (LE), etc. A "non-connected vehicle" 140, herein, is a vehicle that lacks the communication capability just described. For illustration purposes, FIG. 1 also includes a slow-moving vehicle 145 in the far-right lane, one example of a traffic "incident" that spawns an application request implicating the configuration and activation of a hierarchical traffic management system.

As shown in FIG. 1, the CVs 130 communicate with a cloud server 150 via communication links 155. As explained in greater detail below, cloud server 150 can embody a system that configures a hierarchical traffic management system in response to an application request, as discussed above. An illustrative hierarchical traffic management system and some architectural variations are described below in connection with FIG. 2.

Figure 2:
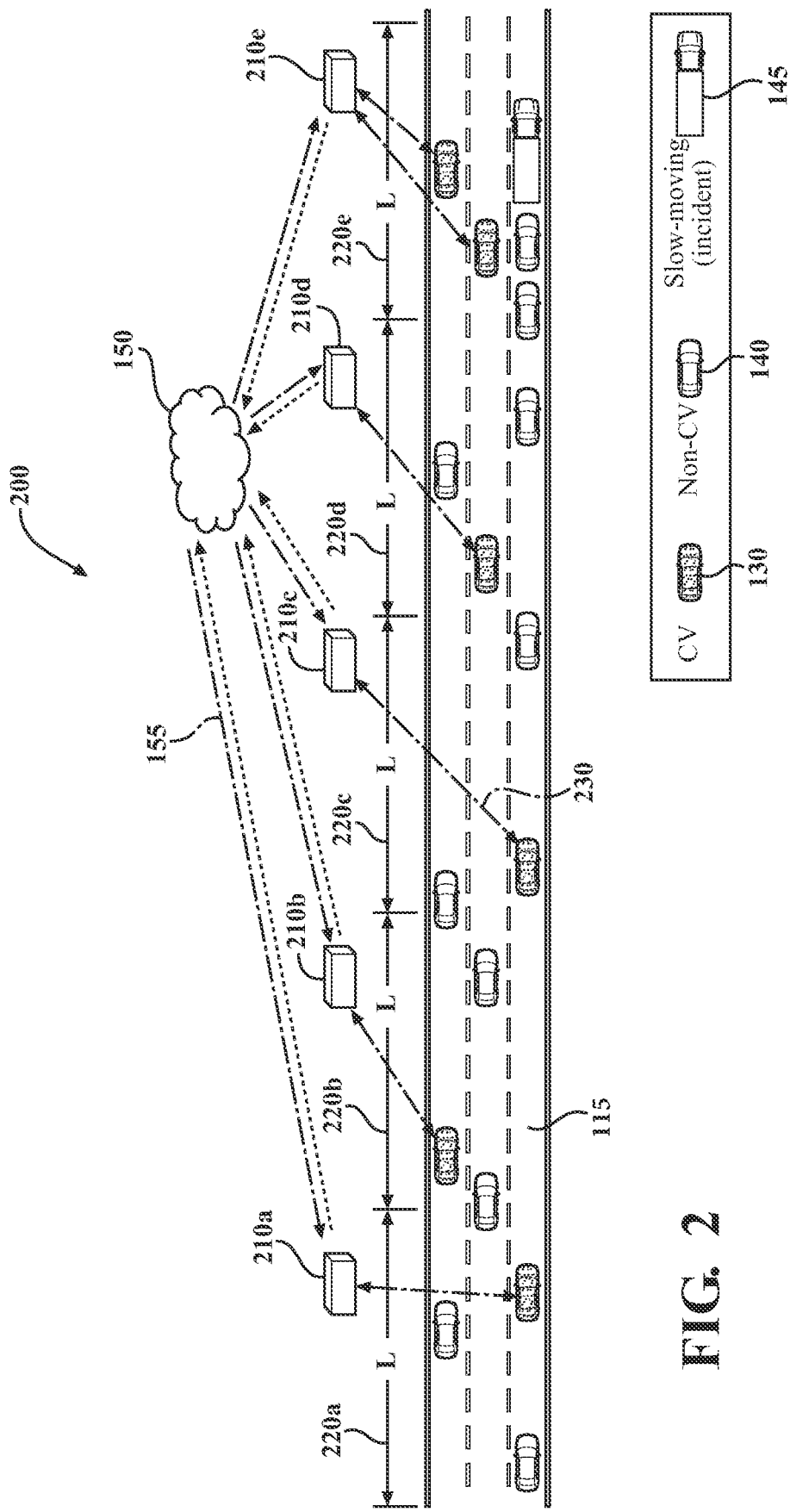
FIG. 2 is an architecture diagram of a hierarchical traffic management system, in accordance with an illustrative embodiment of the invention.

FIG. 2 is an architecture diagram of a hierarchical traffic management system 200, in accordance with an illustrative embodiment of the invention. As shown in FIG. 2, the architecture includes a three-lane roadway 115. The three lanes shown in FIG. 2 are merely illustrative. In other embodiments, roadway 115 may have only two lanes, or it may have more than three lanes. As shown in FIG. 2, roadway 115 is divided longitudinally into a plurality of sections 220a-c. Each section 220 is L meters long, in this embodiment. The depiction of five sections (220a-c) in FIG. 2 is also merely illustrative. In some embodiments, a given cloud server 150 (discussed further below) can serve more or fewer than five sections 220. In some embodiments, cloud server 150 hosts a locality manager at a "locality level" of the hierarchical traffic management system 200. In some embodiments, there is an even higher level than the locality level, such as a "city level," in hierarchical traffic management system 200. In such an embodiment, the city-level manager (e.g., implemented in a cloud server) communicates with one or more locality-level managers assigned to different geographical regions within a city.

As shown in FIG. 2, the roadway sections 220a-e are served, respectively, by corresponding section managers 210a-e. The section managers 210a-e collectively constitute a "section level" of hierarchical traffic management system 200. The section manager 210 of a given section 220 communicates with one or more CVs 130 in that section over a communication link 230. As shown in FIG. 2, a given section 220 can also include one or more non-CVs 140. The section managers 210a-e receive vehicle-dynamics and traffic-state information from the connected vehicles 130 in their respective sections 220. Such data can include reports of vehicle positions, velocities, and measured distances among vehicles on roadway 115.

Though FIG. 2 depicts the section managers 210a-e as infrastructure devices (e.g., roadside units (RSUs) or edge servers), the configuration shown in FIG. 2 is merely illustrative. In one embodiment, computing resources in cloud server 150 are configured as one or more section managers 210. Since a hierarchical traffic management system 200 often includes a plurality of sections 220, the computing resources of cloud server 150 can be partitioned into N section managers 210, where N is a natural number greater than or equal to two. In some embodiments, each partition devoted to a section manager 210 is a separate virtual server hosted in cloud server 150.

In another embodiment, the CVs 130 within a given section 220 are organized as a micro cloud (i.e., the given section 220 is a mobile micro cloud). Within each micro cloud (section 220) of the hierarchical traffic management system 200, a particular CV 130 can be designated by the cloud server 150 to host the section manager 210 for that micro cloud. That is, the section-manager functionality can be implemented in an onboard computing system of the designated CV 130.

In yet another embodiment, the section managers 210 are roadside-infrastructure devices (e.g., RSUs or edge servers), as depicted in FIG. 2. As those skilled in the art will realize, the cloud-based and micro-cloud-based embodiments discussed above are more flexible and potentially less expensive than an embodiment in which the section managers 210 are realized as roadside-infrastructure devices.

Figure 3:
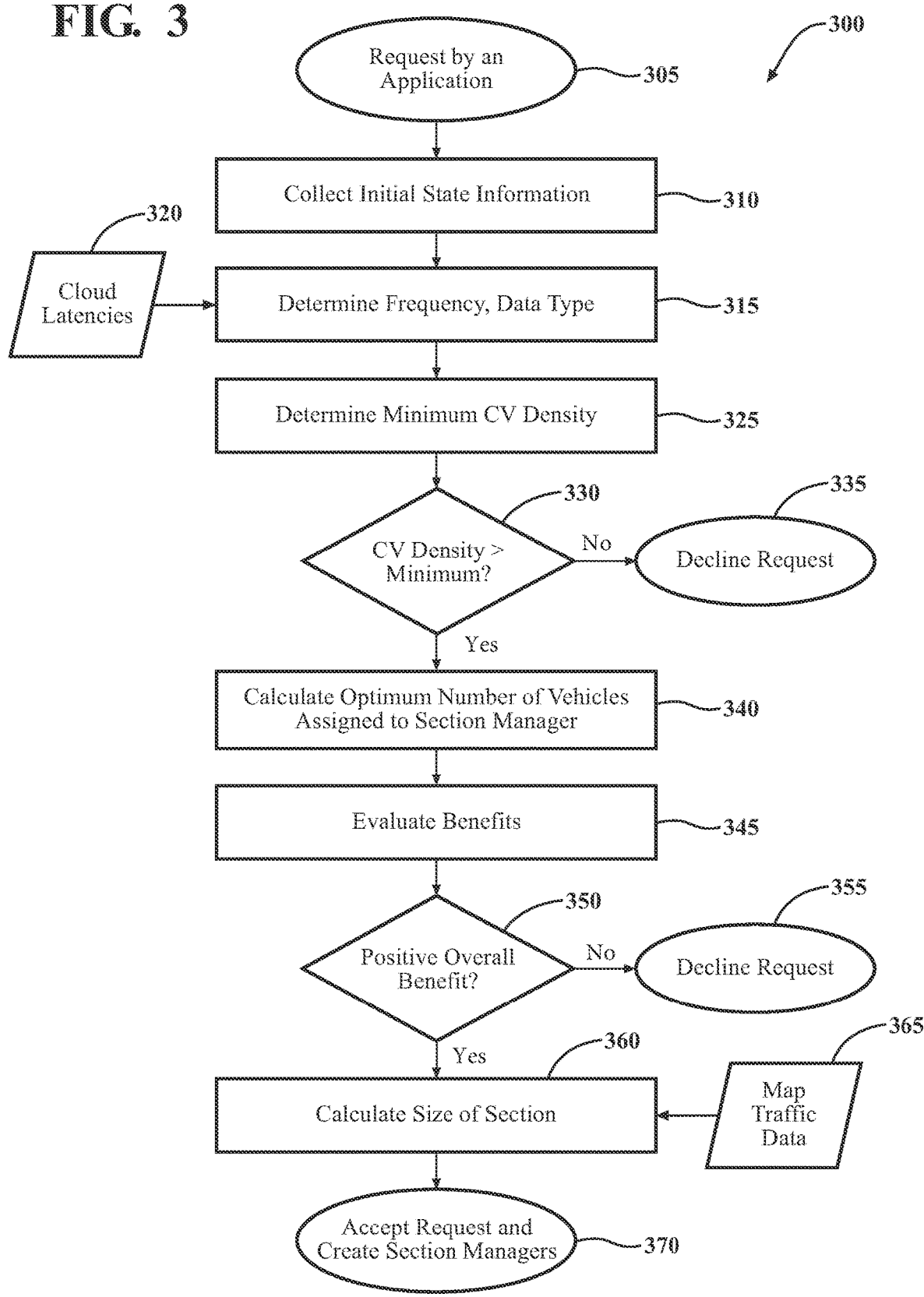
FIG. 3 is a process flow diagram for system that configures a hierarchical traffic management system, in accordance with an illustrative embodiment of the invention.

FIG. 3 is a process flow 300 diagram for a system that configures a hierarchical traffic management system 200, in accordance with an illustrative embodiment of the invention. Process flow 300 will be discussed from the perspective of cloud server 150 in FIG. 2. While process flow 300 is discussed in combination with cloud server 150, it should be appreciated that process flow 300 is not limited to being implemented within cloud server 150, but cloud server 150 is instead one example of a system that may implement process flow 300.

At block 305, cloud server 150 receives a request from an application implicating the configuration (setting up, instantiation) of a hierarchical traffic management system 200. In transmitting the request to the cloud server 150, the application includes one or more requirements (e.g., latency, accuracy, communication frequency/interval, area of interest 110). In some embodiments, the application also includes, with the request, the expected benefits of fulfilling the request.

For illustration purposes, the actions making up process flow 300 are, to some extent, discussed below in terms of an example in which a crash has occurred on roadway 115, and an incident management system (the application, in this example), prompted by CVs 130 or a cloud server, transmits a request to cloud server 150 for detailed lane-level traffic data for a 4-km-long segment of roadway 115 (refer to the area of interest 110 depicted in FIG. 1).

At block 310, cloud server 150 collects initial state information from the CVs 130 within the area of interest 110 and estimates metrics such as traffic density, penetration rates of the CVs 130 (e.g., the percentage of the total vehicles in a particular geographic area such as area of interest 110 or a section 220 that are CVs 130), and the sensor capabilities of the respective CVs 130.

At block 315, cloud server 150 determines the minimum frequency at which to interact with the CVs 130 via the section managers 210. For example, if the cloud latency is 20 s and the incident management system in the example mentioned above requires real-time data with less than 60 s delay, the upload period should be less than 40 s. Also, the type of data (e.g., raw sensor data or processed/interpreted detection results) associated with the respective CVs 130 is identified. For example, if a CV 130 has Light Detection and Ranging (LIDAR) capability that can detect all surrounding vehicles, that CV 130 can collect data pertaining to multiple vehicles in several lanes. On the other hand, if a CV 130 has only Global Positioning System (GPS) capability, only the position of that particular vehicle will be available to a hierarchical traffic management system 200, once the system has been configured and activated.

Figure 4:
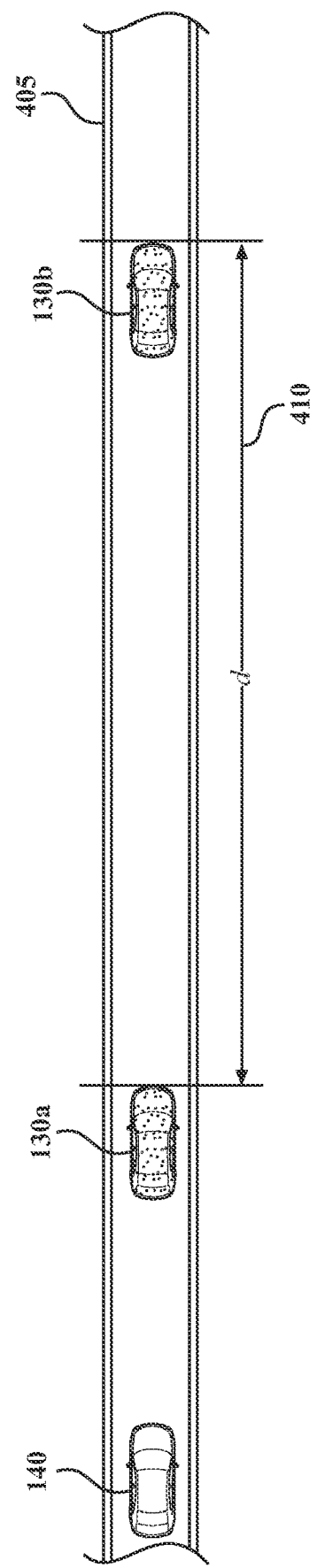
FIG. 4 illustrates the distance between connected vehicles in connection with determining a minimum density of connected vehicles in an area of interest, in accordance with an illustrative embodiment of the invention.

At block 325, cloud server 150 determines (ascertains) the minimum density of CVs 130 per lane of roadway 115 to meet the requirements accompanying the application request. Cloud server 150 accomplishes this by considering the sensor capabilities of the CVs 130, current traffic conditions, and cloud-related communication latencies 320. For example, if the incident management system requires receiving information at least once every 20 s (let this interval be T), once a CV 130 passes a point along a road section within the area of interest 110, the following CV 130 needs to pass the same point within 20 s. This is illustrated for a CV 130b (leading) and a CV 130a (following) traveling in a lane 405 in FIG. 4. The distance between the leading and following CVs just mentioned is labeled as distance 410 (d) in FIG. 4. FIG. 4 also includes a non-CV 140 for the sake of illustration. If the average speed of the leading and following CVs (130b and 130a, respectively, in FIG. 4) is 10 m/s, the maximum distance d between two CVs 130 should be $d_{max}=v \cdot T=10 \cdot 20=200$ m, in this example. The minimum CV density then becomes $$\rho_{min} = \frac{1000}{d_{max}} = 5 \text{ CVs/km/lane.}$$

In other words, at least 5 CVs 130 should be available in each kilometer of each lane 405 of roadway 115 to support the application request.

At block 330, cloud server 150 determines whether the current measured CV density in the area of interest 110 is greater than the minimum CV density determined at block 325. If so, the process flow 300 proceeds to block 340. If not, cloud server 150, in this embodiment, declines the application's request at block 335 because cloud server 150 is unable to accommodate the request.

At block 340, cloud server 150 employs a mathematical algorithm to calculate the optimal number of CVs 130 to be assigned to a given section manager 210 that minimizes an objective function that can include cost, energy consumption, and latency. The mathematical algorithm can include constraints that account for both computational and latency requirements. For example, if the computational complexity of an application is in the form of $2^n$, where n is the number of CVs 130, adding a single vehicle will double the computations and increase the associated energy consumption. In one embodiment, the optimization problem is framed as $$\min_n (\beta_1 \text{cost}_n + \beta_2 \text{energy}_n),$$

subject to (communication<communication limit) and (latency<latency limit). For the sake of the example application mentioned above, it will be assumed that the optimal number of CVs per section 220 is 30 (i.e., n=30).

At block 345, cloud server 150 evaluates the benefits of configuring and activating a hierarchical traffic management system 200 based on the benefits the application expects. For example, a lane-level navigation application can be expected to reduce fuel consumption. However, adding cloud-side computations and the associated communication will increase energy consumption. Cloud server 150 evaluates the overall benefits of instantiating a hierarchical traffic management system 200 in accordance with the parameters stemming from the current application request.

At block 350, cloud server 150 determines whether configuring and activating a hierarchical traffic management system 200 would, under the circumstances, provide a positive overall benefit. If so, process flow 300 proceeds to block 360. If not, cloud server 150 declines the application's request at block 355.

At block 360, cloud server 150 calculates the size of a section 220 to be managed by a given section manager 210. In doing so, cloud server 150 uses the optimal number of vehicles calculated at block 340 and, based on the number of lanes of roadway 115, road network topology, the minimum CV density determined at block 325, and CV penetration rate, computes the size of the section 220. As discussed above, the calculated size of the section 220 can be expressed as a length or an area, depending on the embodiment. In calculating the size of the section 220, cloud server 150 can also consider map traffic data 365.

Referring again to the example of the incident management system's request and the 4-km-long area of interest 110 (refer to FIG. 1), recall that the roadway 115 is a three-lane highway (m=3). In this embodiment, calculating the size of a given section 220 in the hierarchical traffic management system 200 involves calculating the length L of the section 220:

$$L = \frac{n}{\rho_{min} \cdot m} = \frac{30}{5 \cdot 3} = 2 \text{ km}.$$

Since the area of interest 110, in this example, is 4 km long, cloud server 150 will, in configuring a hierarchical traffic management system 200, set up two section managers 210 (e.g., partition two virtual servers), each of which is dedicated to managing a particular section 220. As those skilled in the art are aware, a given section manager 210 implemented as a server in the cloud (a portion of the computing resources available to cloud server 150) can communicate with the CVs 130 within its assigned geographical section 220 by virtue of the cellular communication network with its geographically distributed base stations.

At block 370, cloud server 150 accepts the application's request and activates (instantiates) a hierarchical traffic management system 200 in accordance with the calculated size of the section 220, whether it is expressed as a length or as an area. In general, a given hierarchical traffic management system 200, once configured and activated, continues to exist for as long as it is needed. Depending on the particular application and its associated request, the lifetime of a hierarchical traffic management system 200 could vary from a few minutes to several hours. Once a hierarchical traffic management system 200 is no longer needed, it can be torn down. That is, the resources it consumes can be freed up in cloud server 150 so that a new and different hierarchical traffic management system 200 can be instantiated in response to a new application request.

Figure 5:
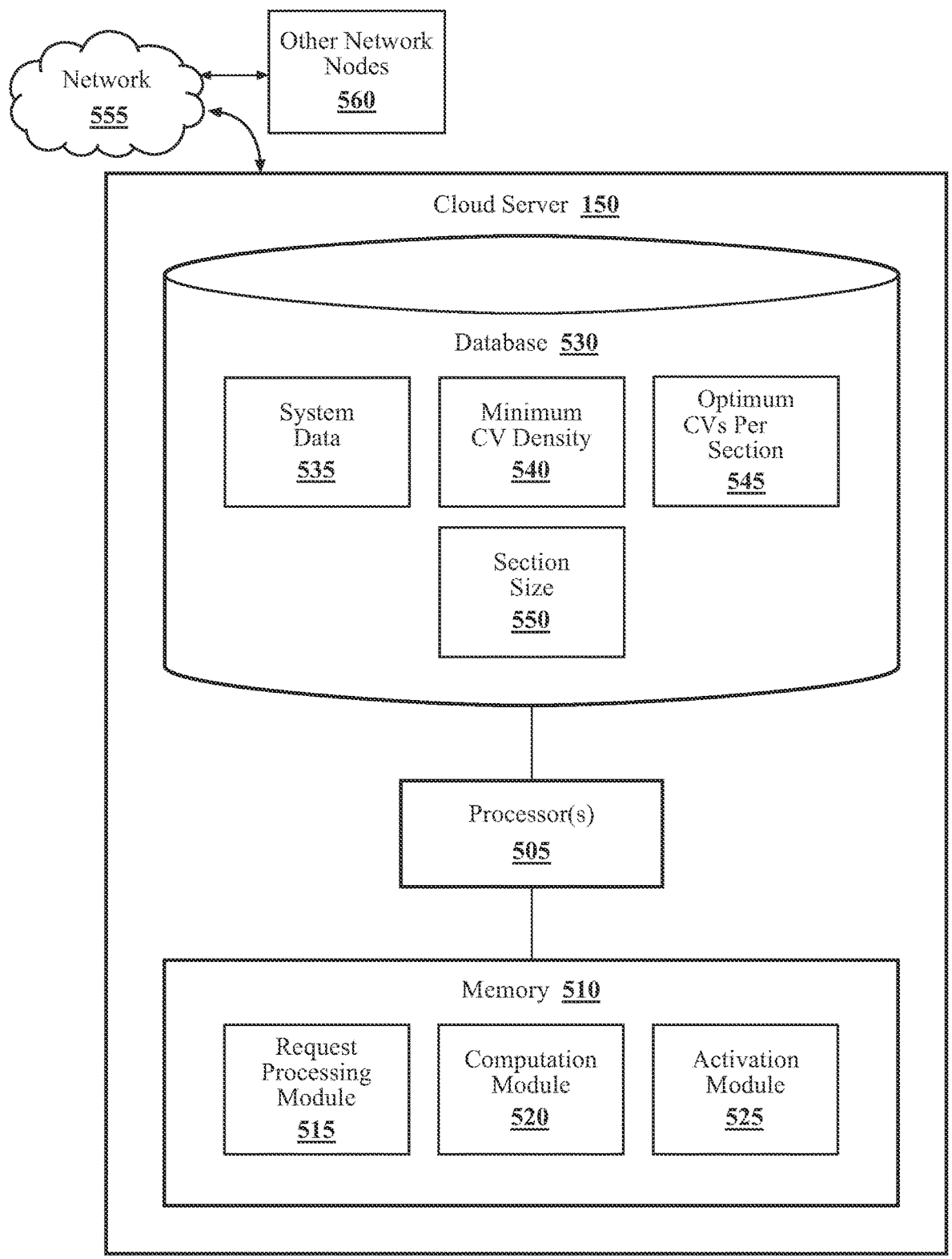
FIG. 5 is a block diagram of a cloud server that configures a hierarchical traffic management system, in accordance with an illustrative embodiment of the invention.

FIG. 5 is a block diagram of a cloud server 150, in accordance with an illustrative embodiment of the invention. As discussed above, cloud server 150 is a system that can configure and activate a hierarchical traffic management system 200. In FIG. 5, cloud server 150 includes one or more processors 505 to which a memory 510 is communicably coupled. Memory 510 stores a request processing module 515, a computation module 520, and an activation module 525. The memory 510 is a random-access memory (RAM), read-only memory (ROM), a hard-disk drive, a flash memory, or other suitable non-transitory memory for storing the modules 515, 520, and 525. The modules 515, 520, and 525 are, for example, machine-readable instructions that, when executed by the one or more processors 505, cause the one or more processors 505 to perform the various functions disclosed herein.

As shown in FIG. 5, cloud server 150 can store various kinds of data in a database 530. For example, cloud server 150 can store system data 535, minimum CV density 540, optimum CVs per section 545, and section size 550. System data 535 includes a variety of different kinds of data cloud server 150 uses in configuring and activating a hierarchical traffic management system 200. For example, system data 535 can include, without limitation, application requirements, the initial state data for CVs 130 discussed above, communication intervals, data types (e.g., raw sensor data, processed detection results, etc.), CV penetration rates, traffic-related metrics, and cost and energy-consumption computations. Minimum CV density 540, optimum CVs per section 545, and section size 550 are discussed above in connection with FIG. 3.

As shown in FIG. 5, cloud server 150 can communicate with other network nodes 560 (e.g., other servers, CVs 130, infrastructure devices, etc.) via a network 555. In some embodiments, network 555 includes the Internet. In communicating with other network nodes 560, cloud server 150 uses communication technologies such as high-speed Ethernet, fiber-optic connections, cellular data (LTE, 5G, 6G, etc.), DSRC, Bluetooth® LE, etc.

Request processing module 515 generally includes instructions that, when executed by the one or more processors 505, cause the one or more processors 505 to receive, at cloud server 150, a request from an application. As discussed above in connection with FIG. 3, the request includes requirements and implicates the configuration of a hierarchical traffic management system 200. Examples of applications and their associated requests are also described in greater detail above.

Computation module 520 generally includes instructions that, when executed by the one or more processors 505, cause the one or more processors 505 to determine, based on information received from one or more CVs 130 in an area of interest 110 pertaining to the request, a minimum CV density 540 per lane 405 of a roadway 115 in the area of interest 110 to meet the requirements of the application. This computation is discussed in detail above in connection with FIGS. 3 and 4.

Computation module 520 also includes instructions that, when executed by the one or more processors 505, cause the one or more processors 505 to calculate an optimum number of CVs 130 to assign to a section manager 210 (optimum CVs per section 545 in FIG. 5) in the hierarchical traffic management system 200. This computation is also discussed in detail above in connection with FIG. 3.

The particular architecture of the section managers 210 varies, depending on the embodiment. As discussed above in connection with FIG. 3, in one embodiment each section manager 210 is one of a plurality of section managers 210 into which the computing resources of cloud server 150 have been partitioned (one section manager per partition). In such an embodiment, each section manager 210 can be implemented as a virtual server hosted by cloud server 150. In another embodiment, a given section manager 210 is implemented in a computing system of an assigned CV 130 in the section 220 of the roadway 115, and the section 220 of the roadway 115 is organized as a micro cloud. As noted above, such a micro cloud is mobile rather than being a fixed geographic region. In yet another embodiment, the section managers 210 are implemented as roadside-infrastructure devices, as depicted in FIG. 2.

Computation module 520 also includes instructions that, when executed by the one or more processors 505, cause the one or more processors 505 to calculate the size 550 of a section 220 of the roadway 115 to be managed by the section manager 210 in the area of interest 110 based, at least in part, on the minimum CV density 540 and the optimum CVs per section 545. The size calculation is also discussed in detail above in connection with FIG. 3. In the embodiment of FIG. 5, the section size 550 calculated for a given section 220 applies to all sections 220 in the hierarchical traffic management system 200 (i.e., the sections 220 are equal in size). As explained above, in some embodiments the section size 550 is expressed as a length, and in other embodiments the section size 550 is expressed as an area. The latter case generally applies when the section 220 in question includes at least a portion of an intersection.

Activation module 525 generally includes instructions that, when executed by the one or more processors 505, cause the one or more processors 505 to activate (instantiate) the hierarchical traffic management system 220 in accordance with the calculated size 550 of the section 220 of the roadway 115. As discussed above in connection with FIG. 3 (see blocks 330 and 350), in some embodiments activation, by activation module 525, of the hierarchical traffic management system 200 in accordance with the calculated size 550 of the section 220 of the roadway 115 is conditioned on one or more of (1) a current measured CV density exceeding the minimum CV density 540 and (2) activation of the hierarchical traffic management system 200 providing an overall positive benefit relative to the associated costs (economic costs, energy-consumption, etc.). The latter benefit-related condition is not applied in all embodiments, however.

Figure 6:
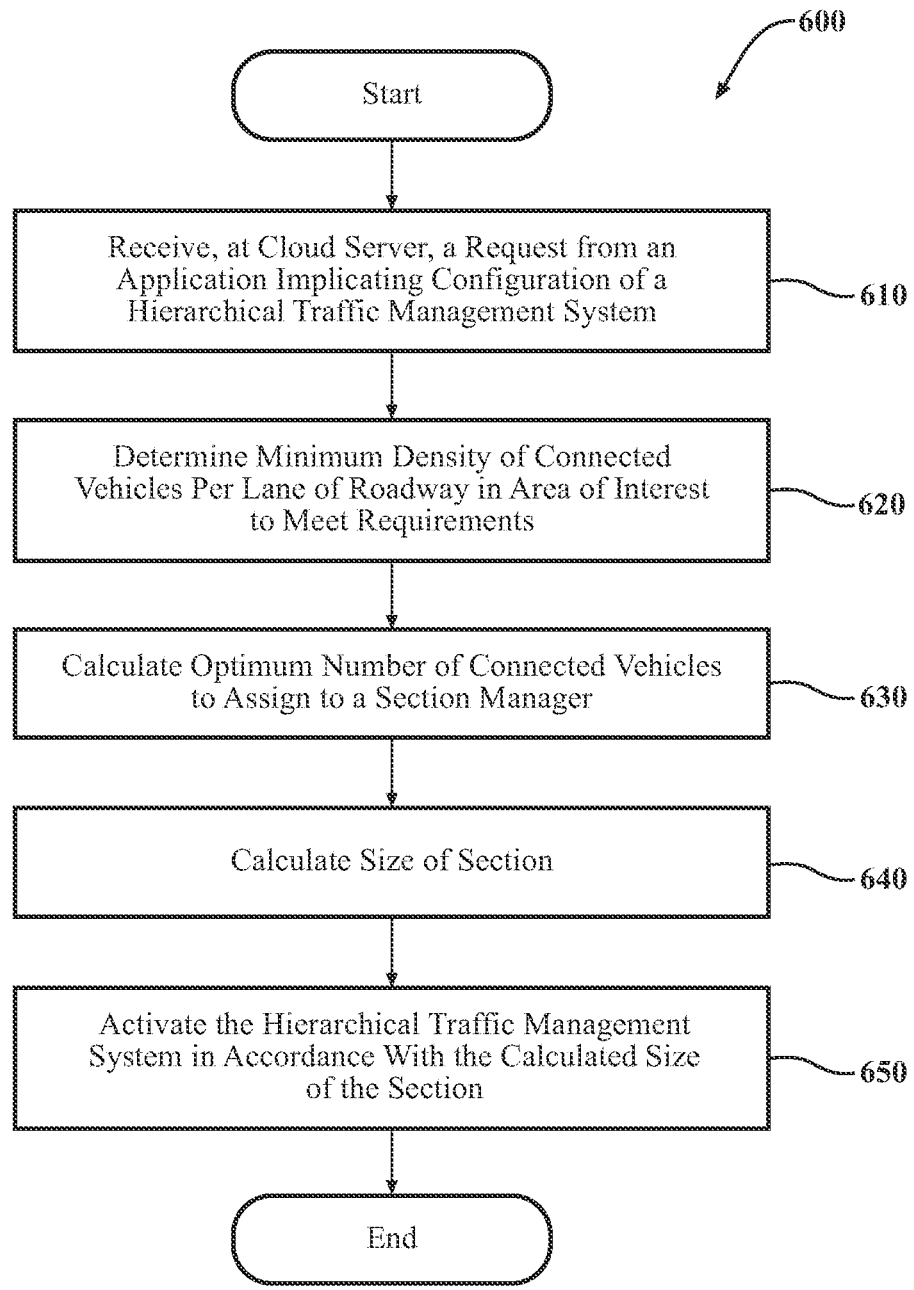
FIG. 6 is a flowchart of a method of configuring a hierarchical traffic management system, in accordance with an illustrative embodiment of the invention.

FIG. 6 is a flowchart of a method 600 of configuring a hierarchical traffic management system 200, in accordance with an illustrative embodiment of the invention. Method 600 will be discussed from the perspective of the cloud server 150 in FIG. 5 with reference to FIGS. 1-4. While method 600 is discussed in combination with cloud server 150, it should be appreciated that method 600 is not limited to being implemented within cloud server 150, but cloud server 150 is instead one example of a system that may implement method 600.

At block 610, request processing module 515 receives, at cloud server 150, a request from an application. As discussed above, the request includes requirements and implicates configuration of a hierarchical traffic management system 200. As discussed above, the application could be, without limitation, an incident management system responding to an incident (e.g., an accident, a slow-moving vehicle, etc.) on a roadway 115, a lane-level vehicle navigation system, a traffic congestion mitigation system, or a driver anomalous behavior management system (e.g., a system that detects and mitigates vehicles driven by substance-impaired drivers). Applications and requests are discussed in greater detail above in connection with process flow 300 in FIG. 3.

At block 620, computation module 520 determines, based on information received from one or more CVs 130 in an area of interest 110 pertaining to the request, the minimum density of CVs 130 (see Element 540 in FIG. 5) per lane of the roadway 115 in the area of interest 110 to meet the requirements of the application. Calculation of the minimum CV density 540 is discussed in detail above in connection with FIGS. 3 and 4.

At block 630, computation module 520 calculates the optimum number of CVs 130 to assign to a section manager 210 in the hierarchical traffic management system 200 (see optimum CVs per section 545 in FIG. 5). Computation of optimum CVs per section 545 is also discussed in detail above in connection with FIG. 3.

At block 640, computation module 520 calculates the size 550 of a section 220 of the roadway 115 to be managed by the section manager 210 in the area of interest 110 based, at least in part, on the minimum CV density 540 and the optimum CVs per section 545. The calculation of section size 550 is also discussed in greater detail above in connection with FIG. 3.

At block 650, activation module 525 activates the hierarchical traffic management system 200 in accordance with the calculated size 550 of the section 220 of the roadway 115. As discussed above in connection with FIG. 3 (see blocks 330 and 350), in some embodiments activation, by activation module 525, of the hierarchical traffic management system 200 in accordance with the calculated size 550 of the section 220 of the roadway 115 by is conditioned on one or more of (1) a current measured CV density exceeding the minimum CV density 540 and (2) activation of the hierarchical traffic management system 200 providing an overall positive benefit relative to the associated costs (economic costs, energy-consumption, etc.). The latter benefit-related condition is not applied in all embodiments, however.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for configuring a hierarchical traffic management system, the system comprising:
a processor; and
a memory storing machine-readable instructions that, when executed by the processor, cause the processor to:
receive, at a cloud server, a request from an application implicating configuration of a hierarchical traffic management system, the request including a requirement regarding at least one of latency, accuracy, and communication frequency associated with responding to the request;
determine, based on information from connected vehicles in an area of the request, a minimum density of connected vehicles per lane in the area to meet the requirement;
calculate, based on the requirement, an optimum number of the connected vehicles to assign to a section management device;
calculate, based on the minimum density and the optimum number, an optimum size of a section of a roadway, in the area, to be managed by the section management device;
allocate resources to activate, via a wireless network, a number of section management devices including the section management device in accordance with the calculated optimum size to respond to the request in a manner that satisfies the requirement, wherein the number of section management devices operate using the allocated resources; and
free up the allocated resources by deactivating the number of section management devices, once a vehicle-related incident associated with the request has been addressed.

2. The system of claim 1, wherein the machine-readable instructions to activate, via the wireless network, the number of section management devices condition activation of the number of section management devices on one or more of (1) a current connected-vehicles density exceeding the minimum density and (2) activation of the number of section management devices providing an overall benefit relative to associated costs that include energy consumption.

3. The system of claim 1, wherein the optimum size of the section of the roadway is expressed as a length.

4. The system of claim 1, wherein the optimum size of the section of the roadway is expressed as an area.

5. The system of claim 4, wherein the section of the roadway includes at least a portion of an intersection.

6. The system of claim 1, wherein the section management device is one of a plurality of section management devices into which computing resources at the cloud server are partitioned.

7. The system of claim 1, wherein the section management device is implemented in a computing system of an assigned connected vehicle in the section of the roadway and the section of the roadway is organized as a micro cloud.

8. The system of claim 1, wherein the section management device is implemented in a roadside-infrastructure device.

9. The system of claim 1, wherein the application is one of an incident management system responding to an incident on the roadway, a lane-level vehicle navigation system, a traffic congestion mitigation system, and a driver anomalous behavior management system.

10. A non-transitory computer-readable medium for configuring a hierarchical traffic management system and storing instructions that, when executed by a processor, cause the processor to:
receive, at a cloud server, a request from an application implicating configuration of a hierarchical traffic management system, the request including a requirement regarding at least one of latency, accuracy, and communication frequency associated with responding to the request;
determine, based on information from connected vehicles in an area of the request, a minimum density of connected vehicles per lane in the area to meet the requirement;
calculate, based on the requirement, an optimum number of the connected vehicles to assign to a section management device;
calculate, based on the minimum density and the optimum number, an optimum size of a section of a roadway, in the area, to be managed by the section management device;
allocate resources to activate, via a wireless network, a number of section management devices including the section management device in accordance with the calculated optimum size to respond to the request in a manner that satisfies the requirement, wherein the number of section management devices operate using the allocated resources; and
free up the allocated resources by deactivating the number of section management devices, once a vehicle-related incident associated with the request has been addressed.

11. The non-transitory computer-readable medium of claim 10, wherein the instructions that activate, via the wireless network, the number of section management devices condition activation of the number of section management devices on one or more of (1) a current connected-vehicles density exceeding the minimum density and (2) activation of the number of section management devices providing an overall benefit relative to associated costs that include energy consumption.

12. The non-transitory computer-readable medium of claim 10, wherein the optimum size of the section of the roadway is expressed as a length.

13. The non-transitory computer-readable medium of claim 10, wherein the optimum size of the section of the roadway is expressed as an area.

14. The non-transitory computer-readable medium of claim 10, wherein the application is one of an incident management system responding to an incident on the roadway, a lane-level vehicle navigation system, a traffic congestion mitigation system, and a driver anomalous behavior management system.

15. A method, comprising:
receiving, at a cloud server, a request from an application implicating configuration of a hierarchical traffic management system, the request including a requirement regarding at least one of latency, accuracy, and communication frequency associated with responding to the request;
determining, based on information from connected vehicles in an area of the request, a minimum density of connected vehicles per lane in the area to meet the requirement;
calculating, based on the requirement, an optimum number of the connected vehicles to assign to a section management device;
calculating, based on the minimum density and the optimum number, an optimum size of a section of a roadway, in the area, to be managed by the section management device;
allocating resources to activate, via a wireless network, a number of section management devices including the section management device in accordance with the calculated optimum size to respond to the request in a manner that satisfies the requirement, wherein the number of section management devices operate using the allocated resources; and
freeing up the allocated resources by deactivating the number of section management devices, once a vehicle-related incident associated with the request has been addressed.

16. The method of claim 15, wherein the activating, via the wireless network, the number of section management devices is conditioned on one or more of (1) a current connected-vehicles density exceeding the minimum density and (2) activation of the number of section management devices providing an overall benefit relative to associated costs that include energy consumption.

17. The method of claim 15, wherein the optimum size of the section of the roadway is expressed as a length.

18. The method of claim 15, wherein the optimum size of the section of the roadway is expressed as an area.

19. The method of claim 18, wherein the section of the roadway includes at least a portion of an intersection.

20. The method of claim 15, wherein the application is one of an incident management system responding to an incident on the roadway, a lane-level vehicle navigation system, a traffic congestion mitigation system, and a driver anomalous behavior management system.

* * * * *